US010152614B2

(12) United States Patent
Smith et al.

(10) Patent No.: US 10,152,614 B2
(45) Date of Patent: Dec. 11, 2018

(54) SYSTEMS AND METHODS FOR ELECTRONIC DEVICE POINT-OF-SALE ACTIVATION

(71) Applicants: Merrill Brooks Smith, Ft. Lauderdale, FL (US); Phillip Craig Graves, Atlanta, GA (US); Phil M Chakiris, Atlanta, GA (US)

(72) Inventors: Merrill Brooks Smith, Ft. Lauderdale, FL (US); Phillip Craig Graves, Atlanta, GA (US); Phil M Chakiris, Atlanta, GA (US)

(73) Assignee: e2interactive, Inc., Atlanta, GA (US)

( * ) Notice: Subject to any disclaimer, the term of this patent is extended or adjusted under 35 U.S.C. 154(b) by 193 days.

(21) Appl. No.: 14/067,541

(22) Filed: Oct. 30, 2013

(65) Prior Publication Data
US 2014/0054375 A1 Feb. 27, 2014

Related U.S. Application Data

(63) Continuation of application No. 12/800,581, filed on May 17, 2010, now Pat. No. 8,655,309, which is a
(Continued)

(51) Int. Cl.
*G06K 5/00* (2006.01)
*G06Q 20/20* (2012.01)
(Continued)

(52) U.S. Cl.
CPC ............ *G06K 5/00* (2013.01); *G06Q 20/202* (2013.01); *G06Q 20/206* (2013.01); *H04W 12/06* (2013.01); *H04W 12/08* (2013.01)

(58) Field of Classification Search
USPC ....................................................... 235/380
See application file for complete search history.

(56) References Cited

U.S. PATENT DOCUMENTS

| 4,414,467 A | 8/1983 | Gould |
| 4,598,810 A | 7/1986 | Shore |

(Continued)

FOREIGN PATENT DOCUMENTS

| EP | 1164777 A | 12/2001 |
| EP | 1361775 A | 11/2003 |

*Primary Examiner* — Michael G Lee
*Assistant Examiner* — David Tardif
(74) *Attorney, Agent, or Firm* — Landmark Intellectual Property Law, PLLC

(57) ABSTRACT

The present invention is directed to systems and methods of activating an electronic device at a point-of-sale (POS). The device may be identified by an indicia and activation may occur following purchase of the device. The method may include the steps of receiving at a central processor from the POS the indicia identifying the device purchased at the POS; enabling by the central processor a feature or functionality of the device or use of the device; and conveying to the device information material to the feature, functionality, or use. The system may include a central processor that activates the device. The central processor may include various interfaces with the POS, provider, and device, as well as a database with records related to the device and an activation processor for determining if activation is appropriate, activating the device, and sending information material to the feature, functionality, or use to the device.

20 Claims, 7 Drawing Sheets

Related U.S. Application Data continuation-in-part of application No. 10/778,338, filed on Feb. 17, 2004, now Pat. No. 7,991,386.

(60) Provisional application No. 60/519,629, filed on Nov. 14, 2003.

(51) Int. Cl.
  *H04W 12/08* (2009.01)
  *H04W 12/06* (2009.01)

(56) References Cited

U.S. PATENT DOCUMENTS

| | | | |
|---|---|---|---|
| 4,668,510 A | 5/1987 | Blumberg | |
| 4,734,005 A | 3/1988 | Blumberg | |
| 4,789,054 A | 12/1988 | Shore | |
| 4,866,661 A | 9/1989 | De Prins | |
| 4,893,705 A | 1/1990 | Brown | |
| 4,967,906 A | 11/1990 | Morello | |
| 5,020,958 A | 6/1991 | Tuttobene | |
| 5,057,677 A | 10/1991 | Bertagna | |
| 5,139,384 A | 8/1992 | Tuttobene | |
| 5,159,560 A | 10/1992 | Newell | |
| 5,256,863 A | 10/1993 | Ferguson | |
| 5,375,240 A | 12/1994 | Grundy | |
| 5,386,455 A | 1/1995 | Cooper | |
| 5,457,307 A | 10/1995 | Dumont | |
| 5,691,684 A | 11/1997 | Murrah | |
| 5,745,036 A | 4/1998 | Clare | |
| 5,765,143 A | 6/1998 | Sheldon | |
| 5,878,401 A | 3/1999 | Joseph | |
| 5,895,453 A | 4/1999 | Cook | |
| 5,913,210 A | 6/1999 | Call | |
| 5,918,213 A | 6/1999 | Bernard | |
| 5,950,173 A | 9/1999 | Perkowski | |
| 5,955,951 A | 9/1999 | Wischerop et al. | |
| 5,978,774 A | 11/1999 | Rogers | |
| 5,984,508 A | 11/1999 | Hurley | |
| 6,018,719 A | 1/2000 | Rogers | |
| 6,025,780 A | 2/2000 | Bowers | |
| 6,085,167 A | 7/2000 | Iguchi | |
| 6,119,099 A | 9/2000 | Walker | |
| 6,131,088 A | 10/2000 | Hill | |
| 6,148,249 A | 11/2000 | Newman | |
| 6,154,738 A | 11/2000 | Call | |
| 6,219,652 B1 | 4/2001 | Carter | |
| 6,269,344 B1 | 7/2001 | Junger | |
| 6,317,028 B1 | 11/2001 | Valiulis | |
| 6,381,582 B1 | 4/2002 | Walker et al. | |
| 6,542,933 B1 | 4/2003 | Durst | |
| 6,550,672 B1 | 4/2003 | Tracy | |
| 6,636,833 B1 | 10/2003 | Flitcroft | |
| 6,829,596 B1 * | 12/2004 | Frazee | G06Q 20/0457 235/380 |
| 6,868,403 B1 | 3/2005 | Wiser et al. | |
| 6,886,742 B2 | 5/2005 | Stoutenburg et al. | |
| 7,035,813 B1 | 4/2006 | Cook | |
| 7,040,541 B2 | 5/2006 | Swartz | |
| 7,117,512 B1 | 10/2006 | Cahill | |
| 7,162,455 B1 | 1/2007 | Sugiymam | |
| 7,195,157 B2 | 3/2007 | Swartz | |
| 7,343,406 B1 | 3/2008 | Buonanno | |
| 7,840,437 B2 | 11/2010 | Lewis | |
| 7,991,386 B2 | 8/2011 | Smith et al. | |
| 8,285,573 B1 | 10/2012 | Ballaro et al. | |
| 8,321,302 B2 | 11/2012 | Bauer et al. | |
| 8,332,323 B2 | 12/2012 | Stals | |
| 8,662,387 B1 | 3/2014 | Geller | |
| 2002/0002503 A1 | 1/2002 | Matsuoka | |
| 2002/0023217 A1 | 2/2002 | Wheeler et al. | |
| 2002/0095299 A1 | 7/2002 | Iwakata | |
| 2002/0153410 A1 * | 10/2002 | Santini | G06Q 20/342 235/375 |
| 2003/0126079 A1 | 7/2003 | Roberson | |
| 2003/0141358 A1 | 7/2003 | Hudson | |
| 2003/0149573 A1 | 8/2003 | Lynton | |
| 2003/0182140 A1 | 9/2003 | Furuya et al. | |
| 2003/0194988 A1 * | 10/2003 | Knox | H04L 12/66 455/406 |
| 2003/0197059 A1 | 10/2003 | Tidball et al. | |
| 2003/0226030 A1 | 12/2003 | Hurst et al. | |
| 2004/0010449 A1 | 1/2004 | Berardi et al. | |
| 2004/0139318 A1 | 7/2004 | Fiala et al. | |
| 2004/0224660 A1 * | 11/2004 | Anderson | G07F 17/00 455/406 |
| 2005/0021458 A1 | 1/2005 | Rowe | |
| 2005/0027624 A1 * | 2/2005 | Cai | G06Q 30/04 705/32 |
| 2005/0080693 A1 | 4/2005 | Foss et al. | |
| 2005/0097054 A1 | 5/2005 | Dillon | |
| 2005/0137882 A1 | 6/2005 | Cameron | |
| 2005/0177517 A1 | 8/2005 | Leung | |
| 2006/0035631 A1 | 2/2006 | White et al. | |
| 2006/0058011 A1 | 3/2006 | Vanska | |
| 2006/0175401 A1 | 8/2006 | Roberts | |
| 2006/0206431 A1 | 9/2006 | Scott et al. | |
| 2006/0247042 A1 | 11/2006 | Walker et al. | |
| 2007/0021969 A1 | 1/2007 | Homeier-Beals | |
| 2007/0100761 A1 | 5/2007 | Dillon | |
| 2007/0114274 A1 | 5/2007 | Gibbs | |
| 2007/0162343 A1 | 7/2007 | Landesmann | |
| 2007/0185788 A1 | 8/2007 | Dillon | |
| 2007/0198418 A1 | 8/2007 | Macdonald et al. | |
| 2007/0219916 A1 | 9/2007 | Lucas | |
| 2007/0257767 A1 | 11/2007 | Beeson | |
| 2007/0262140 A1 | 11/2007 | Long | |
| 2007/0278296 A1 | 12/2007 | Dwyre et al. | |
| 2008/0048030 A1 | 2/2008 | Garner | |
| 2008/0059226 A1 | 3/2008 | Melker | |
| 2008/0070690 A1 | 3/2008 | Van Luchene | |
| 2008/0186174 A1 | 8/2008 | Alexis et al. | |
| 2008/0256600 A1 | 10/2008 | Schrijen | |
| 2008/0285847 A1 | 11/2008 | Panwar | |
| 2009/0006116 A1 | 1/2009 | Baker | |
| 2009/0173782 A1 | 7/2009 | Muscato | |
| 2009/0173784 A1 | 7/2009 | Yang | |
| 2009/0240516 A1 | 9/2009 | Palestrant | |
| 2010/0008535 A1 | 1/2010 | Abulafia | |
| 2010/0042471 A1 | 2/2010 | Chang | |
| 2010/0097180 A1 | 4/2010 | Cardullo | |
| 2010/0174993 A1 | 7/2010 | Pennington | |
| 2011/0091092 A1 | 4/2011 | Nepomniachtchi | |
| 2011/0125609 A1 | 5/2011 | Burger | |
| 2012/0099780 A1 | 4/2012 | Smith | |
| 2012/0234911 A1 | 9/2012 | Yankovich | |
| 2012/0284185 A1 | 11/2012 | Mettler | |

* cited by examiner

FIGURE 6

| DEVICE 620 | INDICIA 610 | AUTHORIZED TO ACTIVATE 630 | PROVIDER 640 |
|---|---|---|---|
| A | 12345 | TERMINAL 1 | X |
| B | 9876 | MERCHANT ψ | Y |
| C | A1B2C3 | LOCATION β | Z |
| D | XYZ0005 | POS A, B, C, D | SELECTABLE |
| E | 007SNS | MERCHANTS A, D, Z | SELECTABLE |

← 650
← 651
← 652
← 653
← 654

60

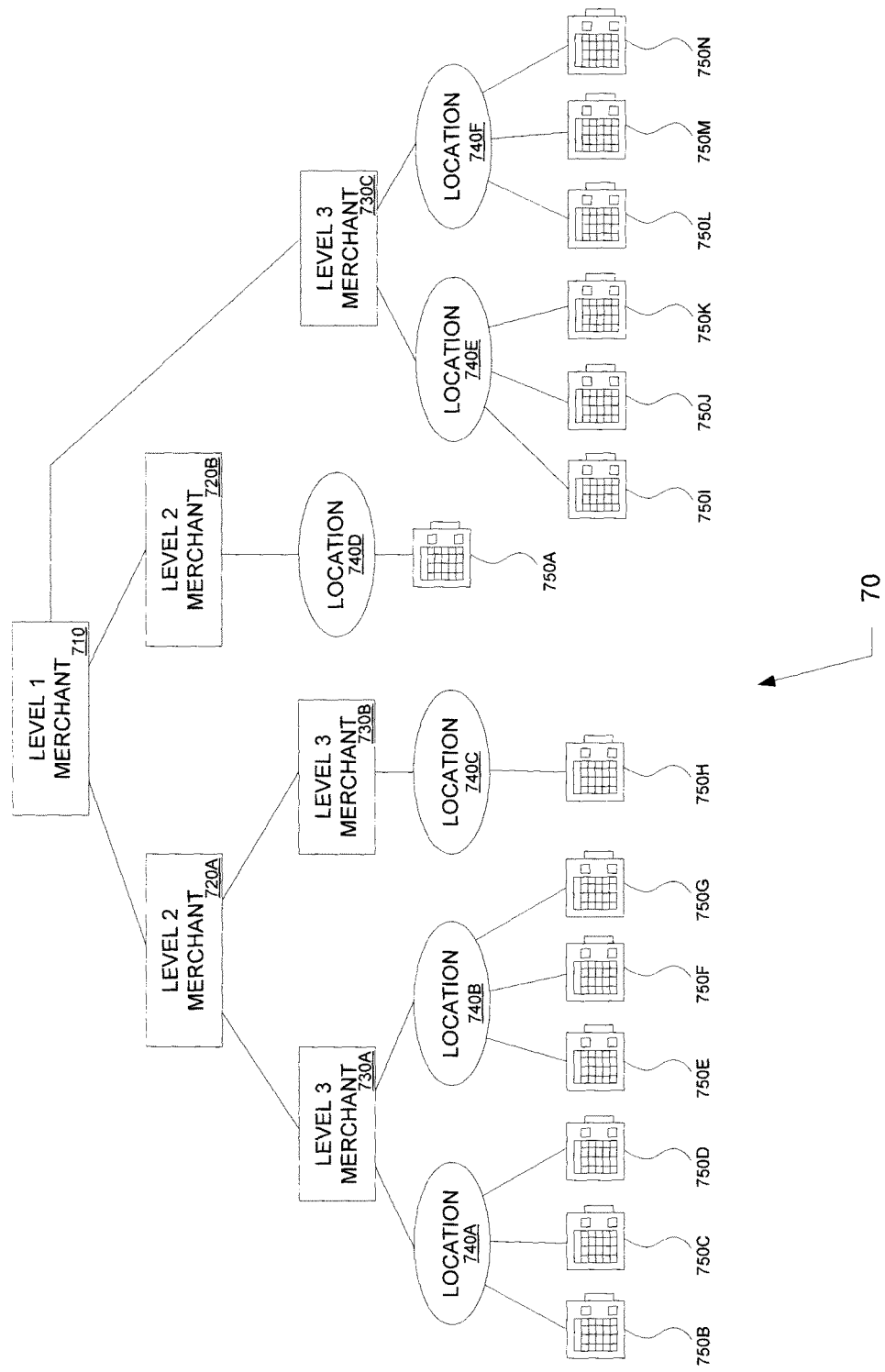

SYSTEMS AND METHODS FOR ELECTRONIC DEVICE POINT-OF-SALE ACTIVATION

RELATED APPLICATIONS

This application is a continuation of U.S. patent application Ser. No. 12/800,581, filed on May 17, 2010, which is a continuation-in-part application from U.S. patent application Ser. No. 10/778,338, filed on Feb. 17, 2004 issued as U.S. Pat. No. 7,991,386 on Jul. 13, 2011, which relies upon U.S. Provisional Patent Application No. 60/519,629 filed on Nov. 14, 2003, each of which is incorporated herein by reference in its entirety.

BACKGROUND OF THE INVENTION

The present invention is generally directed to activating electronic devices at a point-of-sale (POS). Specifically, the present invention is directed to activating an electronic device at a POS following the purchase of the electronic device, wherein all information necessary for such activation is provided at the point-of-sale and the customer receives a communication with additional material information after the purchase and activation.

Electronic devices—such as mobile communications devices, personal digital assistances (PDAs), music players (for example, mp3 players)—may be sold by various retail merchants. Many of these electronic devices are inactive or unusable until they are "activated" by some party. The party activating the electronic device may be the merchant, a provider of goods or services associated with the electronic device (for example, in the case of a mobile telephone, a telecommunications carrier), or a party that maintains an account associated with the electronic device (for example, in the case of a satellite radio, Sirius/XM).

Activation generally requires at least two (2) steps: first a communication between the POS and the party activating the electronic device identifying the communication device, and second a communication between the user of the device and the associated provider of goods or services or account provider. The first step is generally an identification of the electronic device, while the second step typically involves the collection of various data from the user. The merchant and the provider of goods or services or account provider typically rely upon existing infrastructure to support such activation.

Accordingly, such activation process can be time consuming and inconvenient. Therefore, there is a need to provide an activation process for electronic devices that is secure, theft-resistant, and incorporates all activation steps and processes into a single transaction. Additionally, there is a need for an activation process that is convenient to a user of an electronic device, wherein any identification information of the user is collected at the time of sale, and no additional communications with any other party are necessary.

SUMMARY OF THE INVENTION

Aspects of the invention may include a method of activating an electronic device at a point-of-sale, the electronic device identified by a unique indicia and the activation occurring following a purchase of the electronic device in a purchase transaction, the method comprising: receiving at a central processor from the point-of-sale the indicia identifying the electronic device purchased at the point-of-sale; enabling, by the central processor, a feature of the electronic device, a functionality of the electronic device, or use of the electronic device; conveying, from the central processor to the electronic device: an activation confirmation; and information material to the feature, functionality, or use of the electronic device.

Other aspects of the invention may include a method of activating an electronic device at a point-of-sale, the electronic device identified by a unique indicia and the activation occurring following a purchase of the electronic device in a purchase transaction, the method facilitated between a point-of-sale, a central processor, and a provider of goods or services, the method comprising: receiving at a central processor from the point-of-sale the indicia identifying the electronic device purchased at the point-of-sale and information sufficient to identify the point-of-sale; determining, by the central processor: whether the indicia is valid and identifies an non-activated electronic device; whether the point-of-sale is authorized to request activation of the electronic device; upon a positive determination that the indicia is valid and the point-of-sale is authorized, communicating with the provider in order to enable a feature of the electronic device, a functionality of the electronic device, or use of the electronic device; conveying to the electronic device: an activation confirmation; and information material to the feature, functionality, or use of the electronic device.

Other aspects of the invention may include a central processor for activating an electronic device at a point-of-sale, the electronic device identified by a unique indicia and the activation occurring following a purchase of the electronic device from at the point-of-sale, the central processor comprising: a point-of-sale communication interface that provides selectable communication between the central processor and the point-of-sale, the point-of-sale interface configured to receive from the point-of-sale: the indicia identifying the electronic device; and information sufficient to identify the point-of-sale; a provider communication interface that provides selectable communication between the central processor and the provider of goods or services, the provider interface configured to transact communication with the provider regarding a status of the electronic device; a electronic device communication interface that provides selectable communication between the central processor and the electronic device, the electronic device interface configured to send to the electronic device, following activation of the electronic device, information material to the electronic device; a database comprising a record for each electronic device, the record comprising: the indicia identifying the electronic device; a status of the electronic device; information sufficient to identify any point-of-sales that are authorized to request activation of the electronic device; and information sufficient to identify the provider associated with the electronic device; and an activation processor configured to: determine whether the indicia is valid and identifies an electronic device with an inactive status; determine whether the point-of-sale sending the activation request is authorized to request activation of the electronic device; determine the provider associated with the electronic device and enable communication with the provider regarding the status of the electronic device; convey to the electronic device information material to a feature, functionality, or use of the electronic device.

These and other aspects will become apparent from the following description of the invention taken in conjunction with the following drawings, although variations and modifications may be effected without departing from the spirit and scope of the novel concepts of the invention.

BRIEF DESCRIPTION OF THE DRAWING

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to be understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 6 illustrates an exemplary database records used to activate an electronic device at a POS in accordance with some embodiments of the present invention.

FIG. 7 illustrates a representation of a merchant-location-terminal hierarchy that may be incorporated into some embodiments of the present invention.

Figure 1:
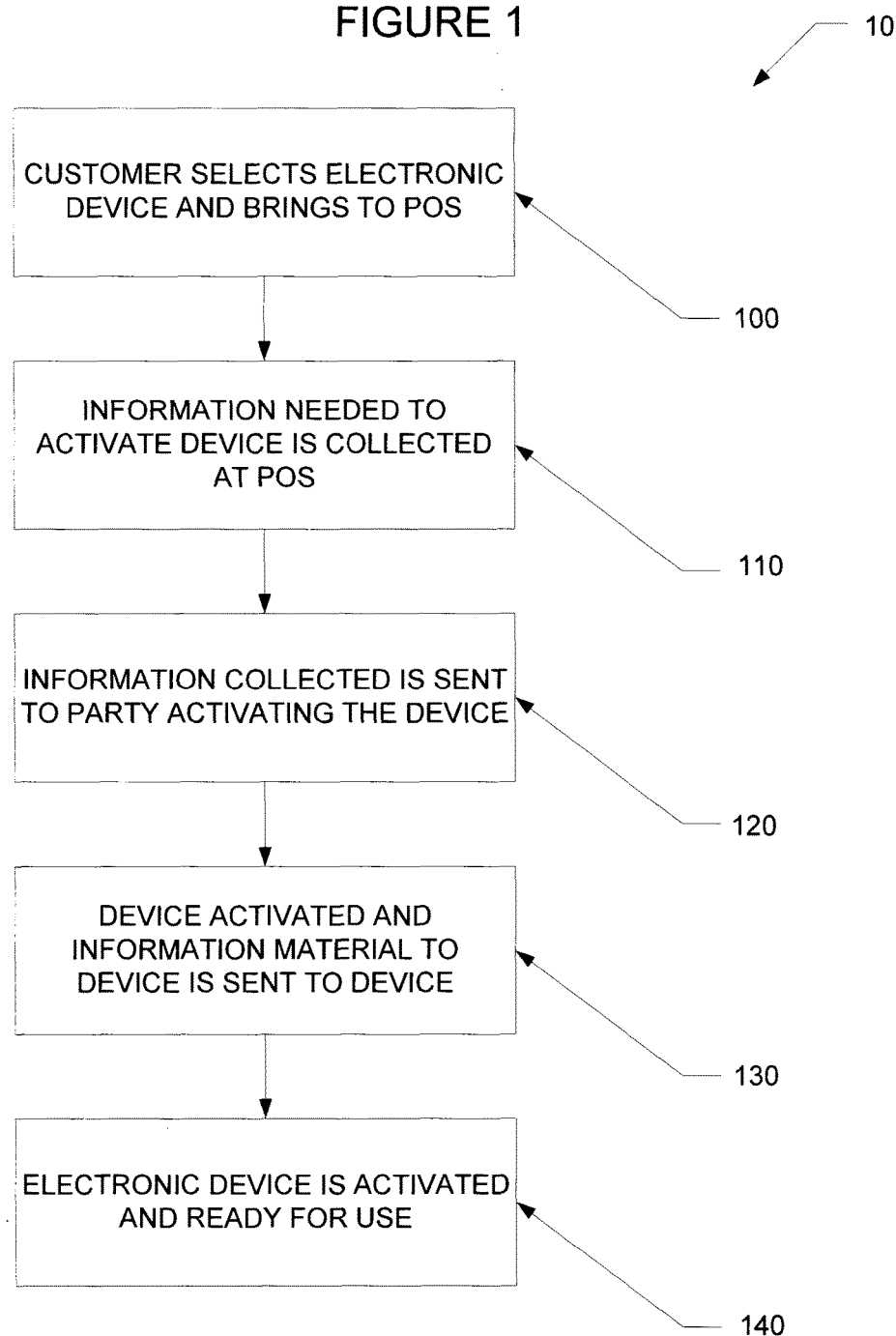
FIG. 1 illustrates a method of activating an electronic device at a POS in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

The matters exemplified in this description are provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular. Reference figures preceded with "S" (e.g., S100) indicates a step.

With reference to FIG. 1, a method 10 for activating an electronic device an accordance with some embodiments of the invention will now be discussed. In general, a method may comprise the selection of an electronic device by a customer, and the customer bringing the electronic device to a POS at S100; information needed to active the device and/or open a necessary or associated account may be collected at the POS at S110; the information collected in S110 may be sent to the party activating the electronic device at S120; information material to the electronic device may be sent to the electronic device from at step S130, and the device may be activated and ready for use at S140.

Note that the POS may be any type of device or location where an electronic purchase transaction occurs. For example, the POS in S100 may be a typical POS device— such as a terminal or register, a merchant, a merchant location, a retail location associated with a specific provider of goods or services, a kiosk, or a vending machine. The POS may be configured with a reading mechanism for reading a printed or encoded indicia from the electronic device or its packaging. Alternatively or in addition, the POS may be configured for manual entry of the indicia. In cases of online or telephone purchases, the POS may be considered to be the electronic device which transacts that actual sale of the electronic device. As used herein, the term "location" does not necessarily refer to a unique geographic location. It is, instead, a way of describing a particular group of POSs that are typically, but not necessarily, located in a particular geographic location (e.g., a merchant store).

In general, each electronic device may be identified by a unique indicia. This indicia may be located on the electronic device itself, or on packaging of the electronic device. The indicia may be any alpha, numeric, or alphanumeric series of numbers and/or letters, or may be a series of symbols or characters. In some embodiments, the indicia may comprise an electronic serial number (ESN), an international mobile equipment identity number (IMEI), a number associated with a subscriber information module (SIM) card, or any other indicia that uniquely identifies the electronic device.

The indicia may be present on the device or packaging in human-readable and/or machine-readable format. For example, the indicia may be present in text, a bar code (either a one-dimensional bar code (a series of lines), or a two-dimensional bar code (an encoded grid)), a magnetic stripe, a radio frequency identification (RFID) tag, or any other human-readable or machine-readable representation.

At S110 information needed to activate the device and/or open a necessary or associated account may be collected. This information may include a unique indicia identifying the specific electronic device purchased by the customer, information identifying an associated provider of goods or services, payment or credit information of the customer, or identification information of the customer. This information may also include identification information of the POS, merchant, merchant location, or network over which the activation request is transmitted.

In some circumstances, desired information may be conveyed from the customer to the POS at S110. For example, a customer may purchase a new communication device at a POS, but desire that the new communication device be assigned the same telephone number that the customer previously used. In this circumstance, along with the other information sent at S110, desired identification information or access numbers may be sent.

The unique indicia that identifies the electronic device may be collected in a manner consistent with the format in which the unique indicia is stored on the device or packaging. For example, if the unique indicia is stored as a bar code, this bar code may be scanned by a bar code reader at the POS. If the unique indicia is stored as a magnetic stripe, this magnetic stripe by may be read by a magnetic stripe reader at the POS. If the unique indicia is stored on an RFID tag, the RFID tag may be read by an RFID interrogator at the POS. If the unique indicia is human readable, this information may be entered into the POS by either the customer or by a merchant employee.

Information identifying an associated provider of goods or services may be located in a separate indicia on the electronic device or packaging, or may comprise an informative segment of the unique indicia identifying the electronic device. For example, a mobile telephone may be identified by the unique indicia VZ12345XYZ, in which the segment "VZ" may identify an associated provider of goods or services.

Information regarding payment or credit information of the customer may comprise a credit card account number, bank account number, or other financial account number of the customer. This information may be collected, for example, by the customer swiping his or her credit card, debit card, or bank card at the POS or providing the identifying information on the customer's credit card, debit card, or bank card to the POS in another manner.

Information regarding payment may also comprise a confirmation that payment has been received. For example, verification of payment actually received (either in cash from the customer, approved by a credit card company, or transferred and received from a bank or financial account) may be necessary before activation. In some circumstances, an electronic device may remain inactive after a customer has purchased the device in a purchase transaction until verification of the receipt of funds is confirmed. If this verification is not received in a timely fashion, the electronic device may be subsequently deactivated. Additionally, if an electronic device is stolen or damaged, or is otherwise not eligible for sale to a customer, the database record corresponding to the electronic device to reflect that the electronic device has been "cancelled," and may not be permitted to be activated.

In some embodiments of the present invention, there may be an assumption that the purchase transaction of the electronic device will be properly completed. In this manner, an electronic device may be activated before funds have cleared, but the electronic device may be subsequently deactivated if the proper funds are not actually received.

Identification information of the customer may also be collected at the POS. This information may comprise the customer's name and/or address. In some embodiments, all identification information may be collected at the POS by the POS receiving some type of governmental identification of the customer. For example, the POS may receive—via a bar code reader or a magnetic stripe reader—a driver's license of the customer, or a passport of the customer. Alternatively, the customer's social security number, date-of-birth, or other identifying information may be keyed into the POS by the customer or by an employee of the merchant.

As noted above, in some embodiments of the present invention the customer may provide desired identification information for the electronic device. For example, if the electronic device has communication capabilities (e.g., a mobile telephone), the customer may provide a desired access number, address, or telephone number. As prepaid electronic devices become more ubiquitous, the ability to swap devices while maintaining the same contact information for family, friends, colleagues, and other informational exchanges becomes more important.

Identification information of the POS, merchant, merchant location, or network over which the activation request may also be transmitted. This information may be used to verify that the requesting POS, terminal, merchant, or merchant location is authorized to activate the electronic device. Systems and methods for such verification may be found in co-pending U.S. patent application Ser. No. 10/655,828, filed on Sep. 5, 2003 and published as U.S. Patent Application Publication No. 20050051619, which is incorporated herein by reference in its entirety. As used herein, identification information of the POS, merchant, merchant location or network means information sufficient to distinguish a particular POS, merchant, location or network from other POSs, merchants, locations or networks. Such identification information may include, by way of example only, an electronic signature or a unique identification code. The identification information may alternatively be a combination of terminal and location or retailer information. For example, a POS may have assigned to it an identification code that is unique only for a particular location or retailer, but when provided in combination with a location or retailer code, uniquely identifies the POS. The identification information may be transmitted along with all transaction requests.

Note that multiple identifiers may be input at the POS. For example, a UPC code may be input as well as an ESN, IMEI, SIM, or other identifier. The UPC may input for merchant inventory purposes, while the ESN or other indicia may be input for purposes of electronic device activation.

At S120, the information collected is sent to the party activating the electronic device. This party may be a provider of goods or services (for example, a telecommunications carrier such as Verizon, or a provider of digital content such as Apple), or a third party that may assume the risk for improper or illegitimate activations. For example, an intermediate party may exist between a merchant and a provider of goods or services. This intermediate party may process the activations, and may shoulder the risk of improper or illegitimate activations. In this manner, the merchant may be encouraged to carry the electronic devices since its liability is limited. Similarly, the provider may be encouraged to distribute associated electronic devices since its liability is also limited. If the POS is a kiosk or vending machine, the party controlling the kiosk or vending machine may receive the information collected at S110.

Note that the information collected in S110 may be sent to the party activating the electronic device in a variety of manners, for example over any network such as a telephone network, a credit or debit card network, the Internet, an intranet, a host-to-host network, and any other type of communication network or connection.

As S130 information material to the electronic device may be sent to the electronic device. For example, if the electronic device is a mobile telephone, the assigned telephone number of the mobile telephone may be sent to the mobile telephone. If the customer provided a specifically requested assigned telephone number, a confirmation or denial of the request may be conveyed.

Other information material to the electronic device may include log-on or password information, access information, contact information, or identification information. This information may also include, but is not limited to information regarding an associated account needed by the device, for example in the case of a digital reader, account information related to the Kindle, Nook, or iPad. This information may be sent to the electronic device in any manner, including but not limited to via a telephone call, a short message system (SMS) or media message system (MMS) communication, an electronic mail message, an applet communication, a video file, or an audio file.

At S140, the electronic device is activated and ready for use. The electronic device may be activated for use by itself, or on a provider network. Additionally, the electronic device may be "activated" by the creation or activation of an account associated with the electronic device. "Activating" the electronic device may comprise changing or modifying the electronic device itself, a network (for example, so that the network recognizes the electronic device), or a provider of goods or services (for example, so that the provider recognizes the electronic device).

In some embodiments, different functions may be activated at different times. For instance, a wireless communication function may be activated at one time, and an mp3 playing function may be activated at another time. Each activation may be enabled by a purchase associated with that function. For instance, a user may purchase a communications device and then activate the service, and the user may later purchase and activate the mp3 player function of the device. Activation of all or part of the functions of a device may also be based on any of the following: the number of times a specific program or type of software has been loaded onto a device; the number of times the device (or a function of the device) has been used; the length of time a device has been used; the time elapsed since purchase of the device; the amount of funds in an account associated with the device; the activity of an account associated with the device; the status of a user account (e.g., having an account in good standing); the status of a user, e.g., with the activation processor or other entity (or marital, employment, or other status); personal information of the user; and other factors.

It should be noted that the electronic device may be inactive or disabled prior to delivery to the customer. For instance, some electronic devices may be hotlined or otherwise disabled at an internal switch. It may be actively or passively disabled. In some embodiments, the merchant may disable the electronic device prior to purchase or making the electronic device available for sale. In some embodiments the electronic device may be disabled before it is distributed to the merchant. Disabling of the media device may occur before it is offered to the customer (e.g., before the product is placed on the store shelves or otherwise offered to the customer).

In the manner outlined in FIG. 1, all information necessary to activate an electronic device purchased from a merchant may be collected in a single step (S110), and information material to the electronic device that the customer needs, or should know, is provided in a single step (S130).

It should be noted that in various embodiments, different identifiers may be used in the different blocks described herein, provided that the different identifiers are associated with a single electronic device. I.e., it is not necessary that the ESN be the single identifier that is used throughout the process. For instance, a bar-coded number (e.g., a number that is mapped to or otherwise associated with a media device identifier in a database) may be scanned at the merchant terminal and passed to a processor, but the processor may determine the indicia of the electronic device and use this indicia for later processing requests and communications. Also, it should be appreciated that the terms "indicia" and "identifier" may comprise information associated with the indicia or identifier. In other words, an indicia or identifier received by a processor need not be the exact same as the indicia or identifier passed from a POS to activate the electronic device, provided that the two identifiers are uniquely associated with the same electronic device.

Figure 2:
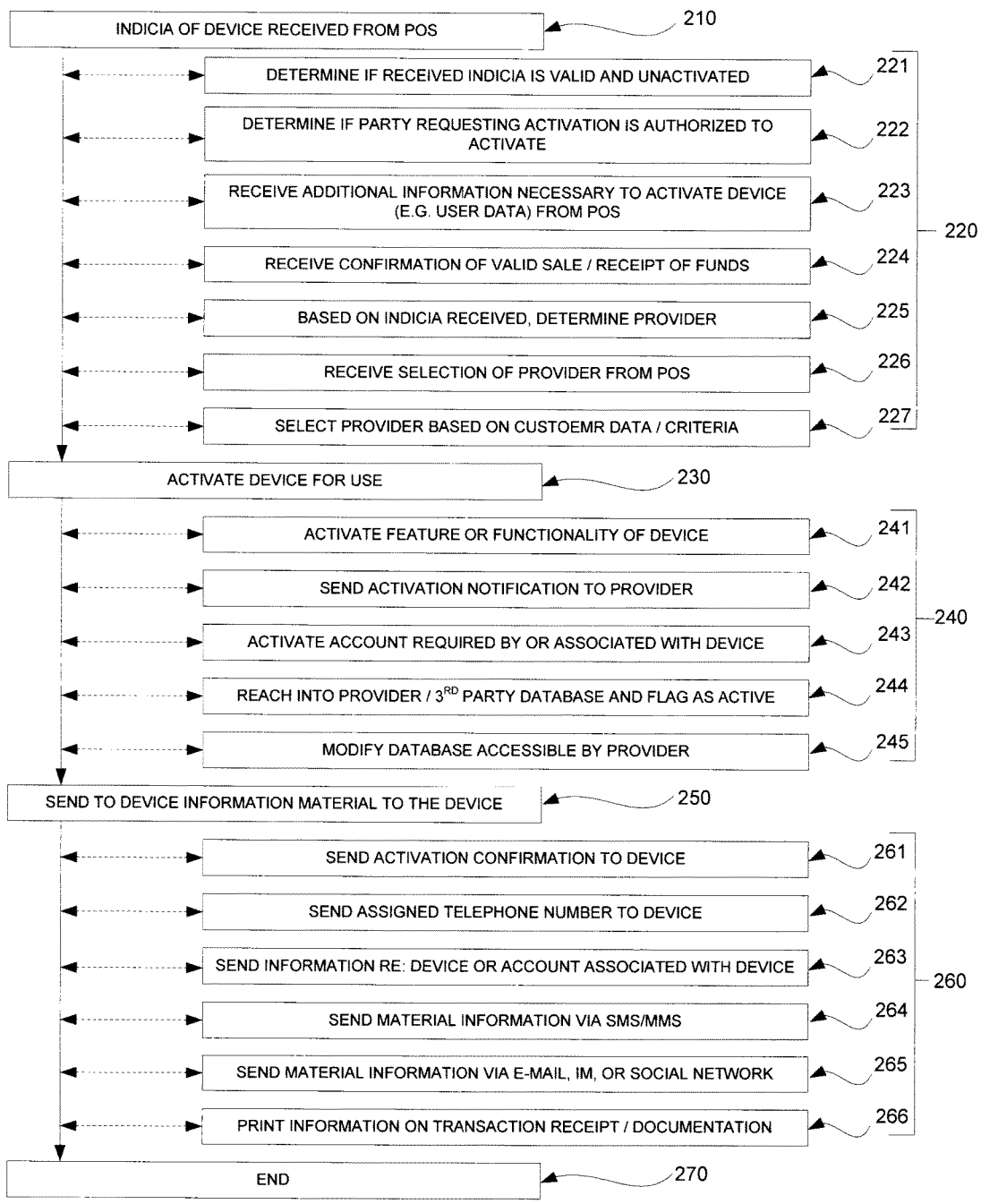
FIG. 2 illustrates a method of activating an electronic device at a POS in accordance with some embodiments of the present invention.

With reference to FIG. 2, a method of activating an electronic device from the perspective of a processor, in accordance with some embodiments of the present invention, will now be discussed. FIG. 2 illustrates a method 20, which comprises four (4) general steps: receiving an indicia of the electronic device from a POS at S210; activating the electronic device at S230; sending to the electronic device material information at S250; and ending the transaction at S270. FIG. 2 also illustrates numerous optional steps which may be included in the method 20.

Once the indicia identifying the electronic device is received from the POS at S210, the processor may perform one or more of the steps S221-S227.

At S221, the processor may determine if the indicia received is valid, and represents an unactivated electronic device. The processor may make this determination by referencing a database that comprises records for each electronic device and indicia.

At S222, the processor may determine if the party requesting activation (e.g., the merchant or POS) is authorized to request activation of the electronic device. The processor may make this determination by referencing a database that comprises records for each electronic device and indicia, as well as information identifying authorized parties for activation. Commonly-owned U.S. Pat. No. 7,578,439 entitled "Value Card PIN Security Method and Device" filed on Jun. 19, 2007 and issued on Dec. 25, 2008 discloses systems and methods for verifying that the party requesting activation for a stored value card is authorized to so request. Similar systems and methods may be utilized. U.S. Pat. No. 7,578, 439 is incorporated herein by reference in its entirety.

Alternatively, at S222 the processor may determine if the party requesting activation is authorized to so request based on whether the requesting source and/or the communications network over which the activation request was transmitted is considered trusted. The processor may make this determination by referencing a database that stores information identifying trusted sources and/or trusted communications networks for making activation requests. The processor may determine if the POS submitting an activation request is authorized to do so. This determination may be accomplished by determining whether the information identifying the POS, merchant, location or network in the request matches an authorized POS, merchant, location or network associated with the electronic. The association between POS, merchant, location or network and an electronic device may be established in a variety of forms including by storing the authorized identification information in the device record itself in the database or by storing a link to a separate record. The association may also include an indirect link through a merchant or location identifier. As noted above, trusted sources may be identified by POS identifier, terminal identifier, merchant identifier, location identifier, via automatic number identification (ANI) processes, IP address, or other such identification information.

At S223, the processor may receive all information necessary to activate the electronic device. In some circumstances, in order to activate the electronic device an account associated with the device may be required to be opened. In accordance with some embodiments of the present invention, a customer purchasing the electronic device at the POS may submit requested identification information, such as a telephone number, to be assigned to the electronic device.

This requested identification information may be related to a previously owned electronic device of the customer (e.g., transferring a telephone number to a newly purchased telephone), or may be selected due to vanity or advertising concerns (e.g., 1-800-BUY-A-CAR).

At S224 the processor may receive an indication from the POS that a valid purchase transaction has been conducted. This indication may include a confirmation that funds were actually received from the customer who purchased the electronic device. At times the electronic device may be given away—for example, in promotional contexts—and in which case the indication would not include a confirmation of value exchange, but rather a confirmation that the a valid transaction has occurred.

At S225 the processor may determine a provider of goods or services associated with the electronic device. As discussed above, this determination may be based upon the unique indicia of the electronic device, or may be determined based upon the processor accessing a database entry of the electronic device which may list or teach the associated provider. Alternatively, the electronic device may not be pre-associated with a specific provider, but rather the customer may select the specific provider at the POS during the purchase transaction. Accordingly, at S226 the processor may receive information sufficient to identify the provider of goods or services selected by the customer to be associated with the electronic device. In another variation, the customer may provide information at the POS regarding ideal or acceptable criteria for a provider or account, and based upon such information the processor may determine the most appropriate provider and associate the most appropriate provider of goods or services with the account. For example, in circumstances where the electronic device is a mobile telephone, the customer may provide information at the POS informing the provider that the majority of anticipated calls on the mobile telephone are international, and the customer does not use other features (e.g., texting, downloads, etc.). At S227 the processor may then apply these criteria to characteristics of various providers and select the provider of goods or services that best fits the customer's needs.

There may be numerous variations to S230, wherein the processor activates the electronic device. S230 may comprise the processor accessing the database record of the electronic device and modifying the status from "inactive" to "active." Additional variations—though not all—are depicted in S241-S244.

In addition to—or in lieu of—activating the electronic device itself, at S241 the processor may activate a feature or a functionality of the electronic device. For example, a user may bring a previously purchased electronic device to a POS and request a purchase of an additional functionality of the electronic device. In one non-limiting example, a user may bring a previously purchased mobile telephone to a POS and request to purchase streaming video capability. An indicia of the mobile telephone may be collected (as discussed above) and the requested functionality of the mobile telephone may be activated. A more thorough discussion of activation of a feature or functionality of a media device may be found in commonly owned U.S. patent application Ser. No. 11/237,950, filed on Sep. 29, 2005 and published as U.S. Patent Application Publication No. 20060217996, which is incorporated herein by reference in its entirety.

At S242, the processor may send an activation notification to a provider of goods or services associated with the electronic device (this provider may be pre-associated in accordance with S225, or may be determined by the customer or the processor in accordance with S226 or S227, respectively).

At S243 the electronic device may be activated by opening or activating an account associated with and/or needed by the electronic device.

At S244 the processor may reach into a database maintained by the provider and modify a record related to the electronic device.

At S245 the processor may modify a record related to the electronic device in a database accessible by the provider (though not necessarily maintained and/or resident on the provider's platform or systems).

At S250 the processor may send to the electronic device information material to the electronic device. As noted above, this material information may include an assigned telephone number, log-on or password information, access information, contact information, identification information, associated account information. This information may be sent to the electronic device in any manner, including but not limited to via a telephone call, a short message system (SMS) or media message system (MMS) communication, an electronic mail message, an applet communication, a video file, or an audio file. Several variations or additional steps are depicted by S261-S266.

At S261, the processor may additionally pass to the electronic device an activation confirmation. At S262, the processor may pass to the electronic device an assigned telephone number. At S263, the information may be information regarding identification of the electronic device or information related to an account associated with the device. At S264 the information passed may be passed via SMS or MMS messaging. At S265 the information may be passed via electronic mail, instant messaging, or social network (e.g., FaceBook, MySpace) messaging. At S266, the processor may pass the information to the electronic device by way of the POS and the customer. For example, information may be sent from the processor back to the POS and printed on a receipt or other documentation for the customer.

At S270 the activation method may terminate and end.

It will be understood that in order to practice the methods of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, It will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations The two distinct pieces of equipment may be connected in any suitable manner. Additionally, the memory may include two or more portions of memory in two or more physical locations.

To explain further, processing as described above is performed by various components and various memories. It will be understood, however, that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, a telecommunications network (e.g., a cellular or wireless network) or any client server system that provides communication, for example. Such communications technologies may use any suitable protocol such as TCP/IP, UDP, or OSI, for example.

Figure 3:
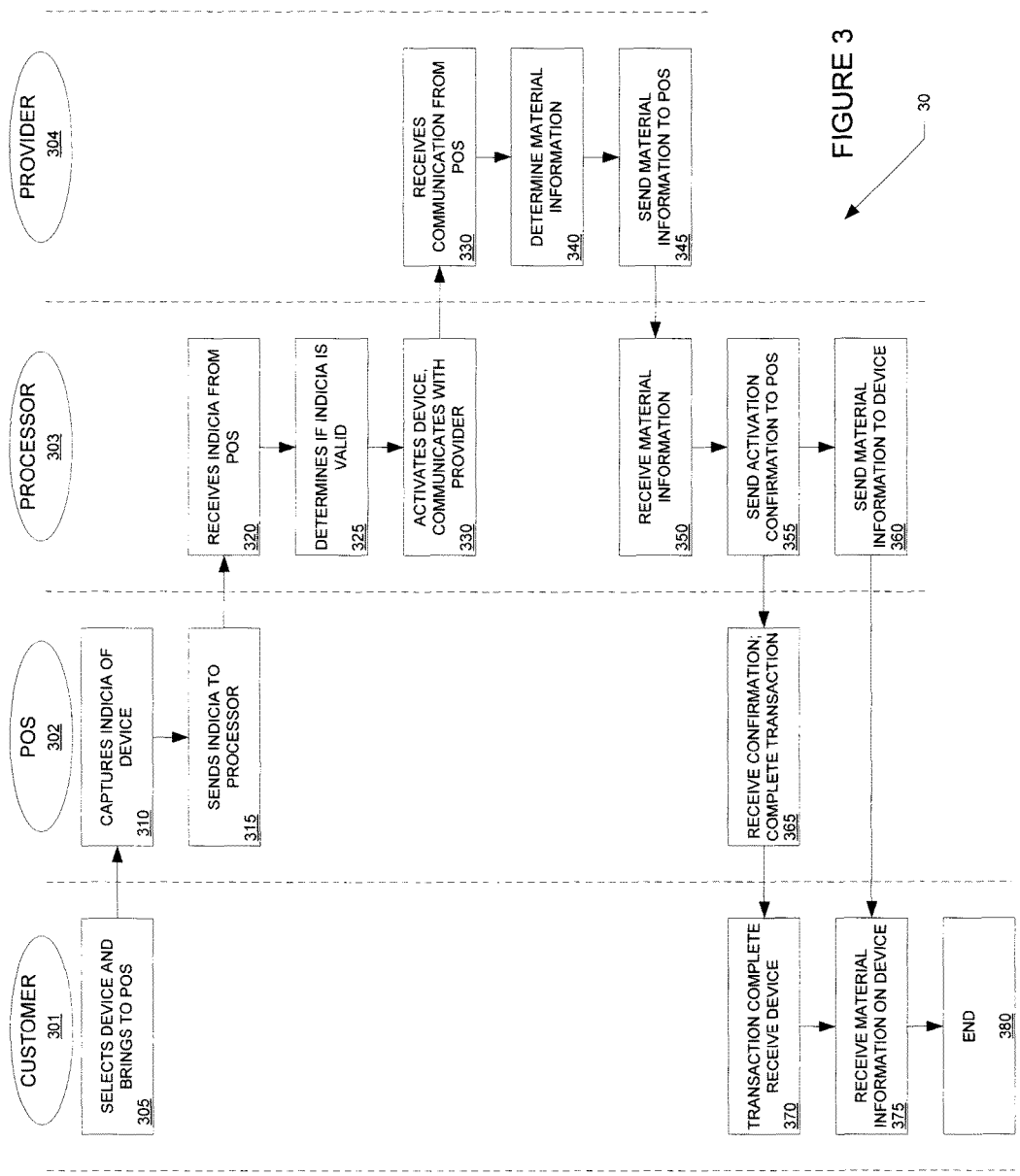
FIG. 3 illustrates a method of activating an electronic device at a POS in accordance with some embodiments of the present invention.

With reference to FIG. 3, a method 30 of activating an electronic device in accordance with some embodiments of the present invention will not be discussed. FIG. 3 indicates which party—a customer 301, a POS 302, a central processor 303, and a provider of goods or services 304—performs each step in the overall process.

At S305 the process begins with the customer 301 selecting and presenting to a POS the selected electronic device. S305 may also be construed to cover the presentment of a previously purchased electronic device at a POS in order to activate an additional feature or functionality of the electronic device. S305 may also be construed to cover POS variations such as on-line shopping where the customer selects an electronic device for purchase, or kiosks or vending machines where the electronic devices are effectively enclosed in the POS itself.

At S310, the POS at the merchant location collects, reads, or captures a unique indicia identifying the electronic device (or the desired additional functionality or feature of the electronic device). At S315, the POS 302 sends the captured indicia to the central processor 303. As noted above, the POS 302 may also capture additional information, such as payment information, credit information, or customer identification information. POS 302 may pass this information to central processor 303 as well.

At S320, the central processor 303 may receive the indicia (and potentially other information) from the POS, and at S325 the central processor may determine if the indicia is valid, and identifies an unactivated electronic device (or feature or functionality of the electronic device). If the determination is positive, at S330 the central processor 303 may activate the electronic device by sending a communication to a provider of goods or services 304. For example, at S330 the central processor 303 may send a communication that modifies a database record at the provider's platform (for example, through an application programming interface (API) of the provider), may send instructions for the provider 304 to modify its database record, or may modify a database record accessible by the provider 304.

At S335 the provider 304 may partake in the activation communication, and may identify the specific electronic device activated. Note that information identifying the electronic device may not be consistent throughout the process steps. For example, the electronic device may be identified by indicia "VZ12345XYZ" at the POS. However, this indicia may be specific to the central processor. The provider may identify the electronic device by "12345XYZ" or even "ZYXWVUT," and it may be this second identifier passed from the central processor to the provider. In other words, the specific indicia or identifier is not as relevant as specifically identifying the electronic device.

At S340, the provider 304 may determine information material to the electronic device, for example an assigned telephone number of a mobile telephone. At S345 the provider 304 may send information material to the electronic device to the central processor 303. Alternatively, this information may be sent directly from the provider 304 to the electronic device. At S350, the central processor 303 may receive the material information. At S355 the central processor 303 may pass an activation confirmation to the POS 302, and at S360 the central processor 303 may pass the material information to the electronic device.

At S365 the POS 302 may receive the activation confirmation from the central processor 303, and at S370 the POS may pass on such confirmation to the customer 301, and may allow the customer 301 to take custody of the electronic device. At S375 the customer 301 may receive the information material to the electronic device (for example, by receiving an SMS, MMS, electronic mail, or instant message on the electronic device itself. At S380 the activation process terminates.

Figure 4:
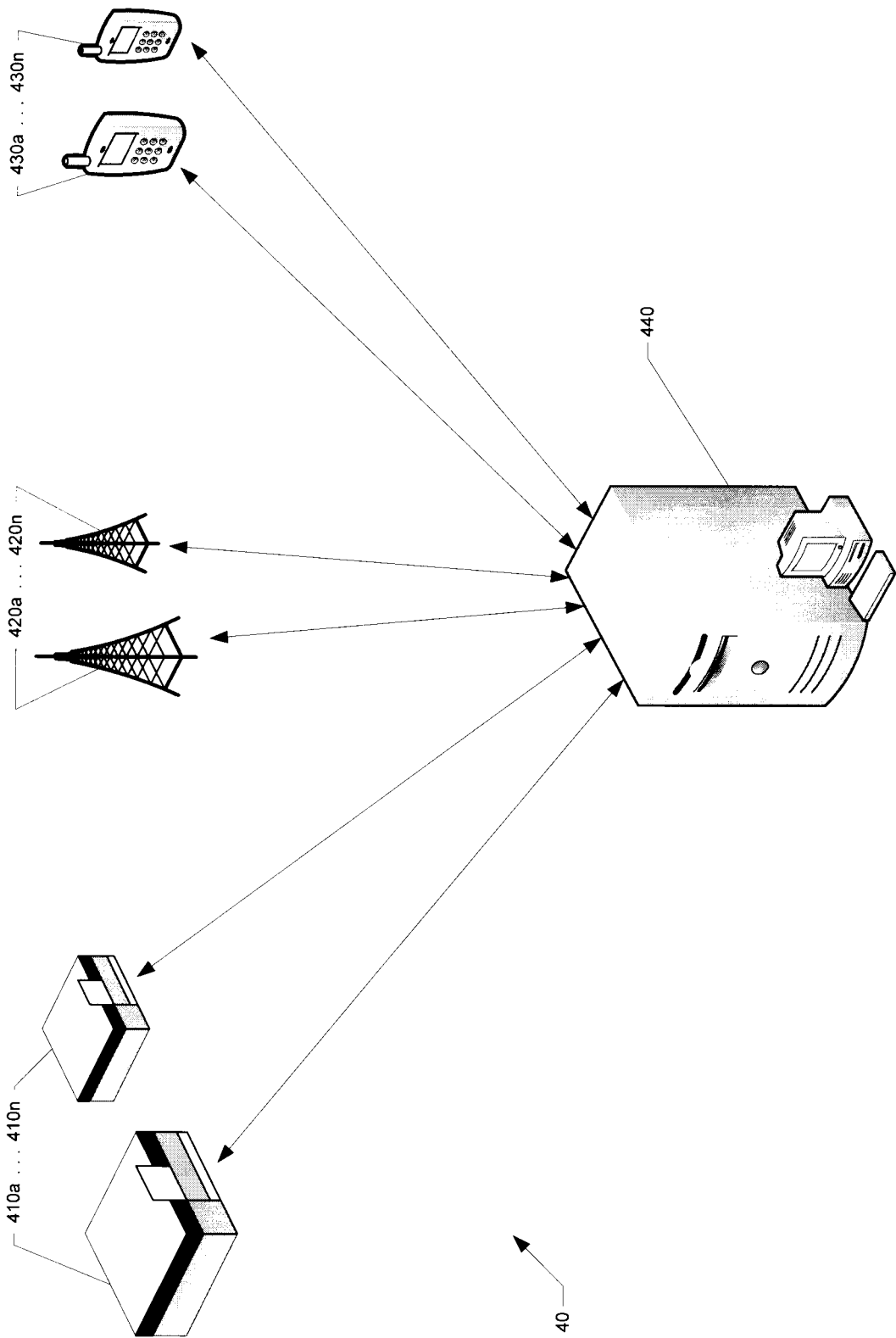
FIG. 4 illustrates a system used to activate an electronic device at a POS in accordance with some embodiments of the present invention.

With reference to FIG. 4, an overall system 40 used to activate an electronic device at a POS in accordance with some embodiments of the present invention is depicted. The system 40 generally comprises a POS 410, one or more providers of goods or services 420a . . . 420n, an electronic device 430, and a processor 440. While the POS 410 is depicted as a POS terminal, the POS may take the form of any type of POS device, location, merchant, or computer. Similarly, while providers of goods or services 420a . . . 420n are depicted identically, each provider 420 may provide different goods or services. For example, provider 420a may provide telecommunication services, provider 420b may provide cable television, provider 420c may provide digital radio services, and provider 420d may provide various periodicals for electronic readers. Similarly, while electronic device 430 is depicted as a mobile communications device (telephone or PDA), electronic device 430 may take any format, including electronic readers, video or audio players, cameras, etc.

As described above, the present invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a magnetic stripe, a laser card, a smart card, a processor chip, a memory chip, a DVD, an integrated circuit, a hard disk, a floppy disk, an optical disk, a flash memory card, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

Figure 5:
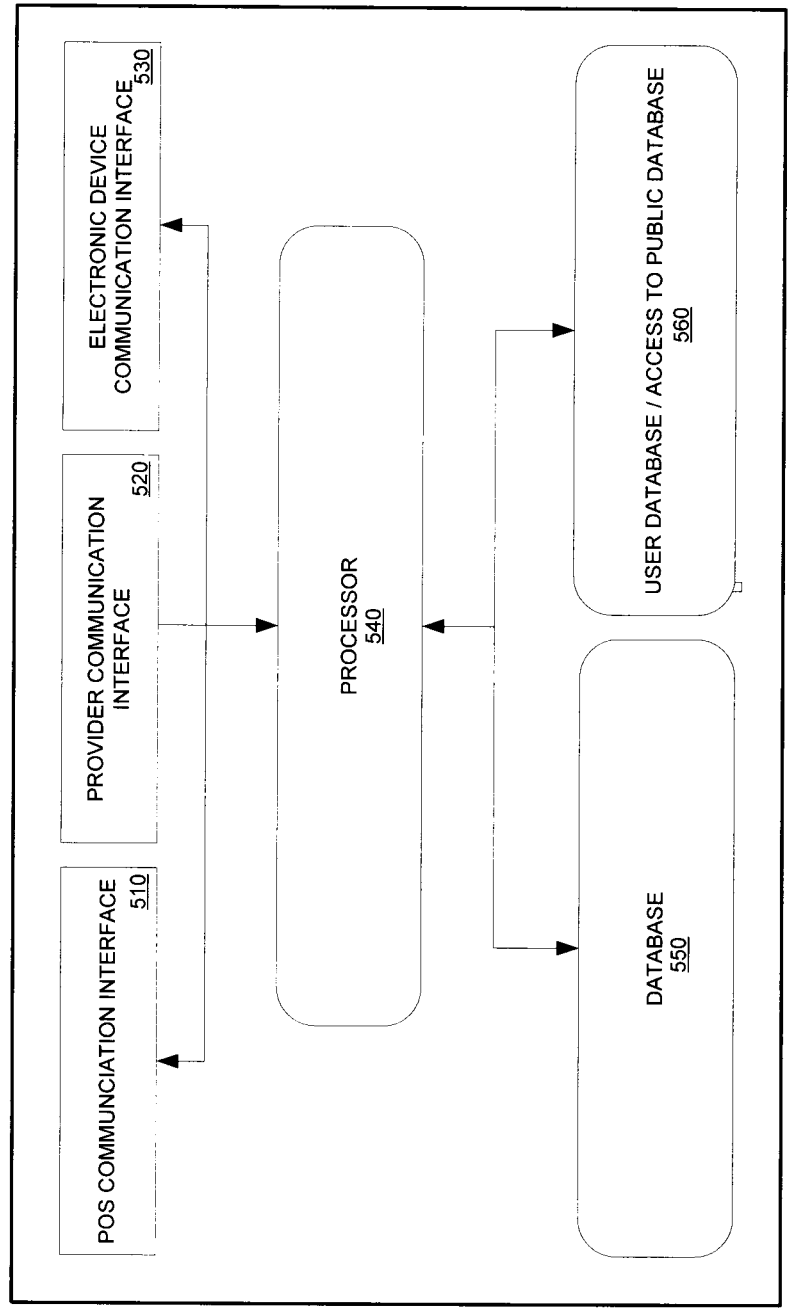
FIG. 5 illustrates a central processor used to activate an electronic device at a POS in accordance with some embodiments of the present invention.

With reference to FIG. 5, a processor 500 may comprise a POS communication interface 510 for selective communication with one or more POS devices, a provider communication interface 520 for selective communication with one or more providers of goods or services, an electronic device communication interface 530 for selective communication with one or more electronic devices, an activation processor 540, and a database 550. Processor 500 may also include a user database or access to a publicly available database of user information 560.

The POS communication interface 510 may handle all incoming and outbound communications with various POS devices, locations, or merchants. In some embodiments, the POS communication interface 510 may take the form of an interface on a host-to-host network. Because each POS may have different requirements or system characteristics, POS communication interface 510 may collectively identify a plurality of interfaces with different POSs.

The provider communication interface 520 may handle all incoming and outbound communications with the one or more providers of goods or services. Because each provider 420 may have different system requirements (e.g., different APIs), the provider communication interface 520 may collectively identify a plurality of interfaces with different providers.

The electronic device communication interface 530 may handle all incoming and outbound communications with the one or more electronic devices. Because each electronic device 430 may have different system requirements (e.g., a mobile telephone may be SMS capable, a PDA may require an electronic mail communication), electronic device communication interface may collectively identify a plurality of interfaces with different electronic devices.

Activation processor 540 performs the various determinations necessary to activate an electronic device. Activation processor 540 may be coupled to database 550 and may therefore be able to determine if a received electronic device indicia is valid and unactivated. The activation processor 540 may be able to determine any preassociated providers of goods or service, or may receive a selection from the customer or may make a selection based on customer criteria and information. The activation processor 540 may postpone activation until funds are confirmed, or may deactivate the electronic device (by way of electronic device communication interface 530) if funds are later deemed inadequate. The activation processor may collect (by way of the POS communication interface) additional information required to activate the electronic device.

Database 550 may include information identifying each electronic device and its relevant details. Database 550 is depicted in greater detail in FIG. 6, and is discussed in greater detail below.

User database or access to a publicly available database of user information 560 is an optional aspect of processor 50. At times customer identification information may be needed to activate an electronic device. As discussed above, this information may be provided by way of scanning or reading a customer's drivers license or passport, or entering the customer social security number. Based upon a customer's drivers license number, passport number, or social security number, the processor 50 may access a publicly available database to provide additional information, such as name, address, date of birth, etc.

FIG. 6 depicts exemplary records from a database 60 coupled to the processor. Database 60 includes records 650-654, with information such as electronic device indicia 610, device information 620, which POS are authorized to activate 630, and which provider is associated with the electronic device 640.

For example, record 650 shows an electronic device "A" identified by indicia "12345" which may be activated by POS terminal A, and which is pre-associated with provider X. Record 651 shows electronic device "B" identified by indicia "9876" which may be activated by merchant ψ (and therefore, any POS devices that are operated by merchant ψ), and which is pre-associated with provider Y. Record 652 shows electronic device "C" identified by indicia "A1B2C3" which may be activated by location β (and therefore, any merchants and POS devices that are present at location β), and with provider Z. Record 653 shows electronic device "D" identified by indicia "XYZ005" which may be activated by POS devices A, B, C, or D, and for which the provider is selectable. Finally, Record 654 shows electronic device "E" identified by indicia "007SNS" which may be activate by merchants A, D, or Z (for example, merchants under one corporate umbrella such as Gap, Old Navy, and Banana Republic), and for which the provider is selectable. These records may be automatically propagated using an API, or may be manually entered by an administrator or by a merchant via an interface available over the Internet.

FIG. 7 illustrates a representation of a merchant-location-terminal hierarchy 70 that may be incorporated into some embodiments of the present invention. FIG. 7 shows a level 1 merchant 710, under which are two (2) level two merchants 720A and 720B, under which are three (3) level three merchants 730A-730C. Continuing down the hierarchy, under the level three merchants are locations 740A-740F, under which are POS 750A-750N.

Any level of the hierarchy may be authorized to request activation of an electronic device. For example only specific POS may be authorized, for example only POS 750A or POS 750A-B. Or locations may be authorized, such as location 740D and 740E, which in turn comprise POS 750H-N. Merchants may be authorized, such as level three merchant 730A, which in turn comprises locations 740A-B, and POS 750B-G. Any authorized point in the hierarchy may authorize the merchants, locations, or POS falling beneath it. If level one merchant 710 is authorized, then all level 2 merchant, level 3 merchants, locations, and POS beneath level one merchant 710 may be considered authorized.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded as illustrative only, and not in a limiting sense, and that the scope of the invention will be solely determined by the appended claims.

What is claimed is:

1. A method of activating an electronic device at a point-of-sale, the electronic device identified by a unique indicia and the activation occurring following a purchase of the electronic device in a purchase transaction, the method comprising:

receiving at a central processor from the point-of-sale the indicia identifying the electronic device purchased at the point-of-sale;

enabling, by the central processor, a feature of the electronic device, a functionality of the electronic device, or use of the electronic device by:
   determining if the indicia is valid; and
   flagging the electronic device as active in a database coupled to the central processor;

conveying, a communication originating from the central processor and unprompted by a user or the electronic device, to the electronic device:
   an activation confirmation; and
   information material to the feature, functionality, or use of the electronic device, comprising a telephone number of the electronic device.

2. The method of claim 1, wherein the electronic device is a mobile communications device.

3. The method of claim 1, wherein the point-of-sale is a merchant terminal at a merchant location.

4. The method of claim 1, wherein the point-of-sale is a kiosk or vending machine.

5. The method of claim 1, further comprising:
communicating the activation of the electronic device with a provider of goods or services that supports the electronic device.

6. The method of claim 5, wherein the step of communicating the activation comprises sending an activation message to the provider of goods or services.

7. The method of claim 5, wherein the step of communicating the activation comprises reaching into a database associated with the provider of goods or services and changing the status of the electronic device.

8. The method of claim 1, wherein the information material to the mobile communications device is conveyed to the mobile communications device via a manner selected from the group consisting of: a short message communication (SMS), a multi-media message (MMS), an electronic mail message, or an applet communication.

9. The method of claim 1, further comprising the steps of:
receiving, at the central processor from the point-of-sale, user information specific to a user or purchaser of the electronic device.

10. The method of claim 9, wherein the user information comprises information sufficient to identify the user or purchaser of the electronic device.

11. The method of claim 10, wherein the information sufficient to identify the user or purchaser of the electronic device comprises information selected from the group consisting of: drivers license information, passport information, social security number information, or date-of-birth information.

12. The method of claim 11, wherein the information comprises drivers license information, and wherein the drivers license information is entered into the point-of-sale by reading a machine readable marking on the drivers license of the user or purchaser of the electronic device.

13. The method of claim 9, wherein the user information comprises a telephone number the user is requesting be assigned to the electronic device.

14. The method of claim 1, further comprising the steps of:
before the enabling step, receiving from the point-of-sale confirmation that the purchase transaction of the electronic device is complete.

15. The method of claim 14, wherein the confirmation comprises information confirming that funds required to purchase the electronic device have been transferred from a buyer of the electronic device to a seller of the electronic device.

16. A method of activating an mobile communications device at a point-of-sale, the mobile communications device identified by a unique indicia and the activation occurring following a purchase of the mobile communications device in a purchase transaction, the method facilitated between a point-of-sale, a central processor, and a provider of goods or services, the method comprising:
receiving at a central processor from the point-of-sale the indicia identifying the electronic device purchased at the point-of-sale and information sufficient to identify the point-of-sale;

determining, by the central processor:
   whether the indicia is valid and identifies an non-activated electronic device;
   whether the point-of-sale is authorized to request activation of the mobile communications device;

upon a positive determination that the indicia is valid and the point-of-sale is authorized, communicating with the provider in order to enable a feature of the mobile communications device, a functionality of the mobile communications device, or use of the mobile communications device;

conveying to the mobile communications device a communication originating from the central processor and unprompted by a user or the mobile communications, the communication comprising:
   an activation confirmation; and
   information material to the feature, functionality, or use of the electronic device, comprising a telephone number of the mobile communications device.

17. The method of claim 16, wherein the step of communicating with the provider comprises sending a communication to the provider from the central processor identifying the electronic device.

18. The method of claim 16, wherein the step of communicating with the provider comprises the central processor reaching into a database associated with the provider and modifying a status indicator of the electronic device.

19. The method of claim 16, wherein the step of communicating with the provider comprises maintaining, by the central processor, a database in which the electronic device is designated as active, and wherein the provider has access to the database.

20. The method of claim 16, wherein the information material to the electronic device is conveyed to the electronic device via a manner selected from the group consisting of: a short message communication (SMS), a multi-media message (MMS), an electronic mail message, or an applet communication.

* * * * *